(12) United States Patent
Dupassieux et al.

(10) Patent No.: US 9,109,168 B2
(45) Date of Patent: Aug. 18, 2015

(54) PRODUCTION OF PARAFFINIC FUELS FROM RENEWABLE MATERIALS USING A CONTINUOUS HYDROTREATMENT PROCESS

(75) Inventors: Nathalie Dupassieux, Lyons (FR); Thierry Chapus, Lyons (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 909 days.

(21) Appl. No.: 13/332,442

(22) Filed: Dec. 21, 2011

(65) Prior Publication Data

US 2012/0165581 A1 Jun. 28, 2012

(30) Foreign Application Priority Data

Dec. 22, 2010 (FR) .................................... 10 05027

(51) Int. Cl.
*C07C 1/00* (2006.01)
*C10G 3/00* (2006.01)
(Continued)

(52) U.S. Cl.
CPC .. *C10G 3/54* (2013.01); *C10G 3/42* (2013.01); *C10G 3/44* (2013.01); *C10G 3/45* (2013.01); *C10G 3/46* (2013.01); *C10G 3/50* (2013.01); *C10G 3/52* (2013.01); *C10G 3/60* (2013.01); *C10G 45/60* (2013.01); *C10G 65/043* (2013.01); *C10L 1/04* (2013.01); *C10L 1/06* (2013.01);
(Continued)

(58) Field of Classification Search
CPC ............. C10G 3/42; C10G 3/50; C10G 3/54; C10G 45/04; C10G 45/06; C10G 45/12; C10G 49/002; C10G 49/04; C10G 67/02; C10G 2300/1081

USPC .............................. 585/240, 242; 44/605, 606
See application file for complete search history.

(56) References Cited

U.S. PATENT DOCUMENTS 4,213,847 A * 7/1980 Chen et al. ............... 208/111.15
5,990,367 A * 11/1999 Stine et al. .................... 585/514
(Continued)

FOREIGN PATENT DOCUMENTS

| EP | 1 741 768 A1 | 1/2007 |
| EP | 2 226 375 A1 | 9/2010 |

(Continued)

OTHER PUBLICATIONS

Search Report of FR 1005027 (May 17, 2011).

*Primary Examiner* — Nina Bhat
(74) *Attorney, Agent, or Firm* — Millen, White, Zelano & Branigan, P.C.

(57) ABSTRACT

A process for hydrotreating a feed originating from renewable sources such as vegetable oils to produce paraffinic hydrocarbons in the presence of hydrogen in excess over the theoretical hydrogen consumption and under hydrotreatment conditions in a fixed bed reactor having a plurality of catalytic zones disposed in series and comprising a hydrotreatment catalyst. The total feed flow is divided into a certain number of different part flows equal to the number of catalytic zones in the reactor; the various part flows are injected into the successive catalytic zones in increasing proportions to produce an effluent comprising paraffinic hydrocarbons. The effluent undergoes a separation step in order to separate a gas fraction and a liquid fraction containing the paraffinic hydrocarbons. At least a portion of said this liquid fraction is recycled to the first catalytic zone so that the weight ratio between said recycle and the part flow introduced into the first catalytic zone is 10 or more.

16 Claims, 2 Drawing Sheets

(51) Int. Cl.
*C10G 45/60* (2006.01)
*C10G 65/04* (2006.01)
*C10L 1/04* (2006.01)
*C10L 1/08* (2006.01)
*C10L 1/06* (2006.01)

(52) U.S. Cl.
CPC ........... C10L 1/08 (2013.01); *C10G 2300/1011* (2013.01); *C10G 2300/1014* (2013.01); *C10G 2300/1018* (2013.01); *C10G 2300/1048* (2013.01); *C10G 2300/4018* (2013.01); *C10G 2300/4081* (2013.01); *C10G 2400/02* (2013.01); *C10G 2400/04* (2013.01); *Y02E 50/13* (2013.01); *Y02E 50/32* (2013.01); *Y02T 50/678* (2013.01)

(56) References Cited

U.S. PATENT DOCUMENTS

| | | | | |
|---|---|---|---|---|
| 6,399,843 | B1* | 6/2002 | Koves | 585/510 |
| 8,022,258 | B2* | 9/2011 | Myllyoja et al. | 585/240 |
| 8,181,942 | B2* | 5/2012 | Sechrist | 261/97 |
| 8,912,374 | B2* | 12/2014 | Van Heuzen et al. | 585/240 |
| 2006/0235254 | A1* | 10/2006 | Gartside et al. | 585/664 |
| 2009/0318737 | A1 | 12/2009 | Luebke | |
| 2010/0242349 | A1 | 9/2010 | Abe et al. | |
| 2011/0152591 | A1* | 6/2011 | Sadler et al. | 585/313 |

FOREIGN PATENT DOCUMENTS

| | | | |
|---|---|---|---|
| EP | 2226375 | * | 9/2010 |
| WO | WO 2007/125332 | * | 11/2007 |

* cited by examiner

PRODUCTION OF PARAFFINIC FUELS FROM RENEWABLE MATERIALS USING A CONTINUOUS HYDROTREATMENT PROCESS

The invention relates to a process for the production of paraffinic hydrocarbons for use as fuels from renewable materials such as oils and fats of vegetable or animal origin.

The current international context is distinguished firstly by the rapid increase in the demand for fuel, in particular gas oil and kerosene base oils, and secondly by the importance of problems linked to global warming and greenhouse gas emissions. This results in an impetus towards reducing dependence on primary energy sources of fossil origin and reducing $CO_2$ emissions. In this context, the search for novel feeds derived from renewable sources constitutes an increasingly important strategy. Examples of such feeds that may be cited are vegetable oils (food quality or otherwise) or those derived from algae or animal fats.

Such feeds are principally composed of triglycerides and free fatty acids, these molecules comprising fatty acid hydrocarbon chains containing in the range 4 to 24 carbon atoms and generally in the range 0 to 3 unsaturated bonds, with higher values for oils from algae, for example. The renewable feeds contain impurities such as nitrogen-containing compounds and metals present in the form of phospholipids containing elements such as phosphorus, calcium, magnesium, potassium and sodium.

The very high molecular mass (>600 g/mol) of triglycerides and the high viscosity of the feeds under consideration mean that using them directly or as a mixture in fuel bases causes difficulties for modern engines. However, the constituent hydrocarbon chains of triglycerides are essentially linear and their length (number of carbon atoms) is compatible with the hydrocarbons present in the fuel bases.

Thus, it is necessary to transform those feeds in order to obtain good quality fuel bases (including diesel and kerosene) which comply with specifications either directly or after mixing with other cuts derived from crude oil. Diesel has to comply with specification EN590 and kerosene has to comply with the requirements described in the "International Air Transport Association (IATA) Guidance Material for Aviation Turbine Fuel Specifications" under ASTM D1655.

One possible approach is the catalytic transformation of triglycerides into deoxygenated paraffinic fuel in the presence of hydrogen (hydrotreatment).

During hydrotreatment, the triglyceride-containing feed undergoes the following reactions:
- a reaction for the hydrogenation of unsaturated bonds of the hydrocarbon chains of the fatty acids of triglycerides and esters;
- deoxygenation reactions, by two reaction pathways:
    - hydrodeoxygenation (HDO), leading to the formation of water by the consumption of hydrogen and to the formation of hydrocarbons containing a number of carbons ($C_n$) equal to that of the initial fatty acid chains;
    - decarboxylation/decarbonylation, leading to the formation of oxides of carbon (carbon monoxide and dioxide: CO and $CO_2$) and to the formation of hydrocarbons containing one fewer carbon atoms ($C_{n-1}$) compared with the initial fatty acid chains;
- hydrodenitrogenation reactions (HDN), which is the designation for reactions which can remove nitrogen from the feed with the production of $NH_3$.

The hydrogenation of unsaturated bonds of hydrocarbon chains (carbon-carbon double bonds) is highly exothermic and the increase in temperature caused by the release of heat may result in temperature levels at which decarboxylation reactions becomes significant. Hydrodeoxygenation reactions, including decarboxylation reactions, are also exothermic reactions. Hydrodeoxygenation is generally favoured over decarboxylation/decarbonylation at lower temperatures. Hydrodenitrogenation reactions are more difficult and necessitate temperatures higher than hydrogenation and hydrodeoxygenation. Hydrodenitrogenation is generally necessary since nitrogen-containing compounds generally inhibit the hydroisomerization catalysts which are optionally used after the hydrotreatment. Hydroisomerization can improve the cold properties of fuel bases after hydrotreatment, especially when kerosene production is planned.

PRIOR ART

As a result, a strict control of the temperature in the hydrotreatment section is necessary; too high a temperature brings disadvantages with favouring unwanted secondary reactions such as polymerization, cracking, coke deposition and catalyst deactivation.

Hence, document EP 1 741 768, which describes a process for the hydrotreatment of vegetable oil which contains more than 5% by weight of free fatty acids, creates unwanted reactions. In order to reduce this problem, that type of starting material undergoes a catalytic hydrotreatment at a temperature in the range 200° C. to 400° C. in the presence of a diluting agent, the ratio of diluting agent to the fresh feed being in the range 5 to 30 by weight. The diluting agent is preferably a product of the process which is recycled.

However, the process proposed in EP 1 741 768 A1 still suffers from the following disadvantages:
- the quantity of recycle to provide the necessary quantity of diluting agent is very high. This presents a high hydraulic load downstream of the reactor and necessitates substantial transformation of existing units in order to accommodate the necessary dimensions of the reactor;
- the hydrogen consumption is reduced by promoting deoxygenation by decarboxylation reactions (formation of CO and $CO_2$) through appropriate selection of the hydrotreatment catalyst. However, deoxygenation of triglycerides by decarboxylation leads to a large drop in the paraffin yield, a loss of activity of the catalyst due to the inhibiting effect of CO and increased corrosion due to the presence of $CO_2$.

Document US 2009/0318737 describes a process for producing fuels (diesel) originating from renewable starting materials such as oils and fats of vegetable and animal origin. The process consists of treating a first portion of a renewable starting material by hydrogenation and deoxygenation in a first reaction zone and a second portion of a renewable starting material by hydrogenation and deoxygenation in a second reaction zone. A portion of the hydrocarbon product is recycled to the first reaction zone to increase the hydrogen solubility of the reaction mixture, using a ratio for the recycle to the first portion of renewable starting materials in the range 2 to 8 by volume (weight ratio in the range 1.7 to 6.9). The fact that the quantity of hydrogen in the liquid phase is maximized means that the degree of deactivation of the catalyst can be reduced, which means that the pressure can be reduced, decarboxylation/decarbonylation reactions can be promoted and hydrodeoxygenation reactions can be reduced, and thus the hydrogen consumption is reduced. No information is given regarding the quantity of nitrogen in the starting materials and the paraffinic effluents.

Application EP 2 226 375 proposes a process for continuous hydrogenation of a feed originating from renewable sources containing triglycerides in a fixed bed reactor system containing a plurality of catalytic beds disposed in series and comprising a hydrogenation catalyst, using less recycle and as a result requiring limited transformation of existing units. The feed is introduced by staged injection so that the various catalytic beds receive more and more feed in the direction of flow. The recycled liquid is added to the first catalytic zone only. This limitation to the quantity of product recycled to the reactor means that the total flow rate in the reactor, and thus the hydraulic load downstream of the reactor, can be limited. The preferred range for the total recycle for the fresh feed is less than 1, preferably less than 0.5 by weight. The ratio of diluent to fresh feed entering each catalytic bed is 4 by weight or less. The inlet temperature is identical for each bed.

Application EP 2 226 375 promotes the hydrodeoxygenation pathway by eliminating oxygen and forming water, rather than eliminating oxygen by decarboxylation reactions. In order to manage the problem with nitrogen-containing compounds and protect hydroisomerization catalysts, document EP 2 226 375 recommends the possibility of using a second reactor carrying out hydrodenitrogenation after the hydrotreatment reactor. This reactor operates at higher temperatures than that for hydrotreatment, as the hydrotreatment temperatures are not high enough to carry out hydrodenitrogenation.

The Applicant has observed that the quantity of nitrogen in the renewable starting material may vary considerably as a function of the origin of the material. In particular, the nitrogen content is generally higher in animal fats than in vegetable oils. Further, adjusting the temperature in the various catalytic zones of the hydrotreatment reactor to levels which are as low as possible in order to promote hydrodeoxygenation reactions leading to the formation of water may cause difficulties in obtaining low nitrogen content levels in the paraffinic fuel produced after hydrotreatment. Thus, it is well known that hydrodenitrogenation reactions (HDN) are more difficult to carry out than hydrodesulphurization reactions (HDS) or hydrodeoxygenation reactions (HDO), and as a result necessitate higher temperatures in order to reach the same level. Too high a level of nitrogen compounds in the paraffinic fuel produced by the hydrotreatment process results in poorer performance for the optional downstream hydroisomerization. Hydroisomerization (HIS) may be advantageous in order to produce diesel with improved cold flow properties and/or to produce kerosene satisfying freezing point specifications. In order to compensate for this effect, it would then be necessary to increase the severity of the HIS section, resulting in a lower yield for high value products such as diesel fuel and kerosene, and a reduced cycle, and as a result, an increase in operating costs.

SUBJECT MATTER OF THE INVENTION

Thus, the aim of the present invention is to propose a process for the hydrotreatment of renewable feeds that can promote hydrodeoxygenation reactions as much as possible by forming water while efficiently using the same process to carry out the hydrodenitrogenation necessary to preserve the catalytic activity of the optional hydroisomerization section.

Thus, the present invention concerns a process for the hydrotreatment of a feed originating from renewable sources in order to produce paraffinic hydrocarbons in the presence of hydrogen in excess of the theoretical hydrogen consumption and under hydrotreatment conditions in a fixed bed reactor having a plurality of catalytic zones disposed in series and comprising a hydrotreatment catalyst, characterized in that:

a) the total feed flow F is divided into a certain number of different part flows F1 to Fn equal to the number of catalytic zones n in the reactor, the first part flow F1 is injected into the first catalytic zone, the second part flow F2 is injected into the second catalytic zone and so on, if n is greater than 2;

the various part flows are injected into successive catalytic zones in increasing proportions such that F1/F is less than or equal to F2/F, which itself is less than or equal to F3/F and so on until F(n−1)/F is less than or equal to Fn/F, in order to produce an effluent containing paraffinic hydrocarbons;

b) said effluent undergoes at least one separation step in order to separate a gaseous fraction containing hydrogen, CO, $CO_2$, $H_2S$, water and light gases and a liquid fraction containing the paraffinic hydrocarbons;

c) at least a portion of said liquid fraction containing paraffinic hydrocarbons is recycled to the first catalytic zone such that the weight ratio between the flow of said recycle and the part flow introduced into the first catalytic zone F1 is 10 or more.

An advantage of the present invention is that it can be used to carry out hydrodenitrogenation and hydrodeoxygenation in the same catalytic zone without having recourse to a second, hydrodenitrogenation, reactor downstream. In fact, introducing the feed in increasing proportions coupled with a large recycle to the first zone means that, by means of an increasing temperature profile, a sufficiently hot zone can be obtained at the end of the catalytic zone to allow hydrodenitrogenation while keeping the temperature sufficiently low at the inlet to the catalytic zone to promote the hydrodeoxygenation reactions.

A further advantage of the present invention consists of promoting the hydrodeoxygenation pathway by eliminating oxygen and forming water, rather than eliminating oxygen by decarboxylation reactions, by controlling the temperatures to keep them adapted to hydrodeoxygenation at the inlet to each catalytic zone. The advantages of this solution are an increase in the yield of paraffinic hydrocarbons and a reduction in the quantity of $CO/CO_2$ formed, which means that the inhibiting effect of CO on the activity of the hydrotreatment catalyst can be limited. Promoting the hydrodeoxygenation pathway also means that corrosion due to the presence of $CO_2$ in the reactor can be limited.

A further advantage of the present invention is the limitation in the quantity of product recycled to the reactor, which means that the total flow in the reactor, and thus the hydraulic feed downstream of the reactor, can be limited.

DESCRIPTION

Figure 1:
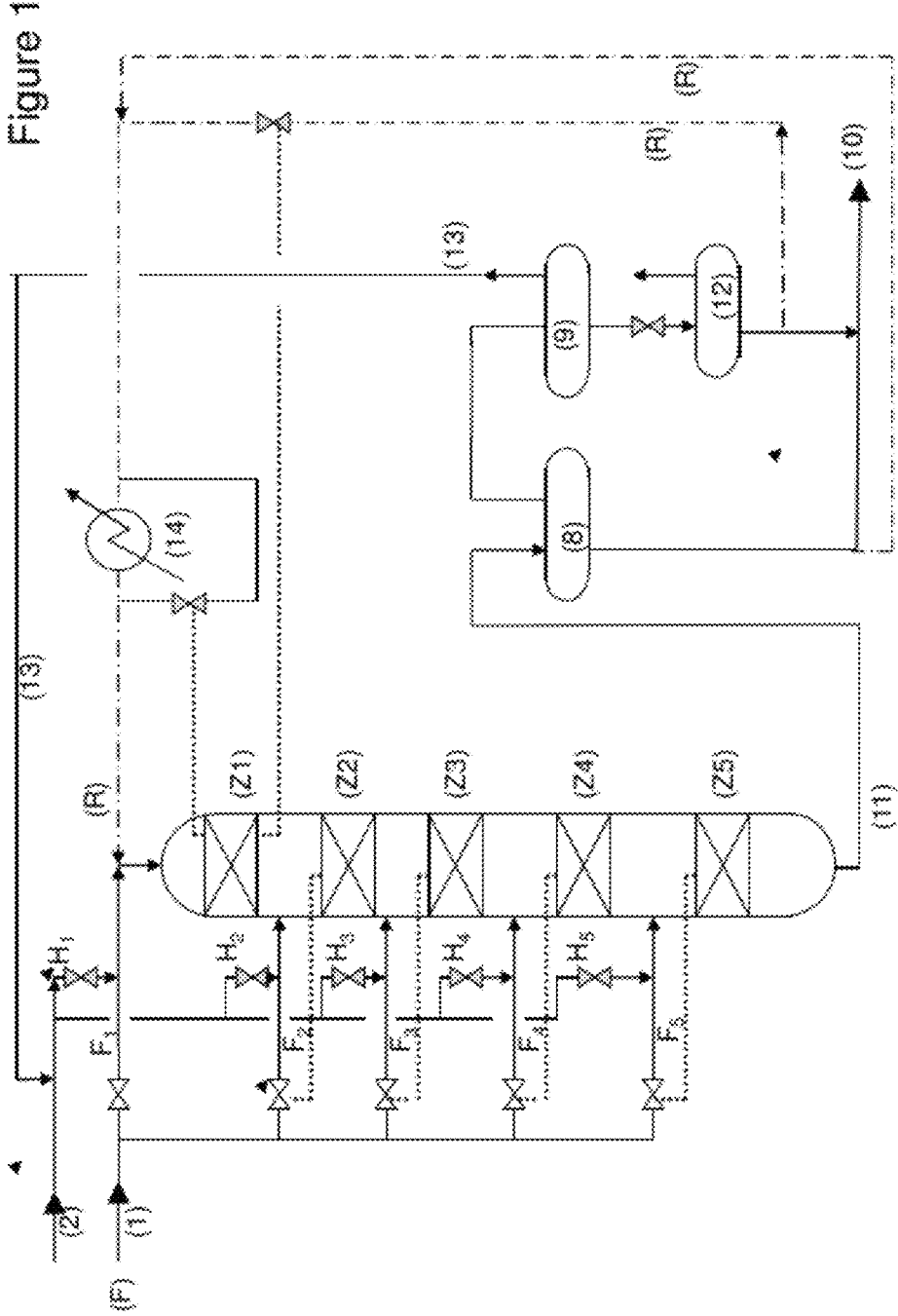
FIG. 1 represents a process in accordance with the invention.

The process of the present invention consists of converting into paraffinic hydrocarbons, more precisely into middle distillates (kerosenes and/or gas oils), a wide range of feeds of renewable origin, essentially composed of triglycerides and fatty acids. These feeds are generally characterized by a high molar mass (usually more than 800 g/mole); the chains of the fatty acids of which they are composed contain in the range 4 to 24 carbon atoms, and generally in the range 0 to 3 unsaturated bonds per chain, with higher values possibly being obtained for certain specific feeds. Non-exhaustive examples of feeds which may be converted by the process of the present invention which may be cited are: vegetable oils such as rapeseed, jatropha, soya, palm kernel, sunflower, olive, coprah and camelina oils, fish oils or heterotrophic or autotrophic algal oils or animal fats such as beef suet, or residues from the paper industry (for example tall oil) or mixtures of these various feeds.

Preferably, the feeds derived from renewable sources are selected from oils and fats of animal or vegetable origin or mixtures of such feeds, containing triglycerides and/or free fatty acids and/or esters.

The various part flows of feed are identical or different in nature. One advantage of the process of the invention consists in its great flexibility, depending on the origin of the feed. Feeds which differ substantially from each other, in particular with different degrees of hydrocarbon chain unsaturation, or with different nitrogen impurity contents, may be completely converted both as regards the elimination of oxygen and as regards the elimination of nitrogen. As an example, it may be possible to treat a feed with a lower nitrogen load (preferably in the first zone) with a feed with a higher nitrogen load (preferably introduced into a subsequent zone).

All of these feeds have high oxygen contents, and also sulphur-containing compounds, in very variable quantities depending on the origin of the feeds, but also nitrogen-containing compounds and metals such as phosphorus, calcium, magnesium, potassium or sodium. The quantity of metals may be up to 2500 ppm. The quantities of nitrogen and sulphur are generally in the range 1 ppm to 100 ppm by weight approximately, preferably less than 100 ppm, depending on their nature. They may reach up to 1% by weight for particular feeds.

The treated feed may be unrefined or it may also have undergone a refining or pre-refining treatment intended to reduce the metals content. This pre-treatment step may already have been carried out or it may be carried out in a pre-treatment section placed upstream of the hydrotreatment reactor. This optional pre-treatment step may consist of a heat treatment associated with passage over solids such as alumina or silica-aluminas, or a steam treatment, or a treatment with acid such as phosphoric acid, for example, or a treatment with ion exchange resin, or a combination of several of these pre-treatment steps. In general, the pre-treatment may include any method (degumming, dephosphatation, etc) which is known to the skilled person for refining food quality oil.

The invention will now be described with reference to the figures in order to facilitate comprehension; the figures do not limit the general nature of the invention.

Hydrotreatment

Unrefined feed, also termed fresh feed, is injected into the line 1 shown in FIG. 1. This feed is mixed with a hydrogen-rich gas 2, which may also contain other inert hydrocarbon compounds, i.e. which do not react per se with the constituents of the feed. The hydrogen may advantageously derive from a makeup of hydrogen and/or from a recycle of hydrogen-rich gas from the separation step after the hydrotreatment step. In practice, the makeup hydrogen may derive from steam reforming or from catalytic reforming, and the hydrogen purity is usually in the range 75% to 95% by volume, the other gases present generally being methane, ethane, propane and butane. The hydrogen-rich gas from the separation step after the hydrotreatment step or from the fractionation step after the optional hydroisomerization step has preferably already undergone one or more intermediate purification treatments before being recycled to the hydrotreatment and/or hydroisomerization process.

According to one characteristic of the invention, the hydrogen used is in excess with respect to the theoretical consumption, the excess of hydrogen representing at least 50% of said theoretical consumption, preferably in the range 75% to 400%, and more preferably in the range 100% to 300%, with 150% being a typical value. The quantity of hydrogen used is controlled by the partial pressure of the hydrogen.

Figure 2:
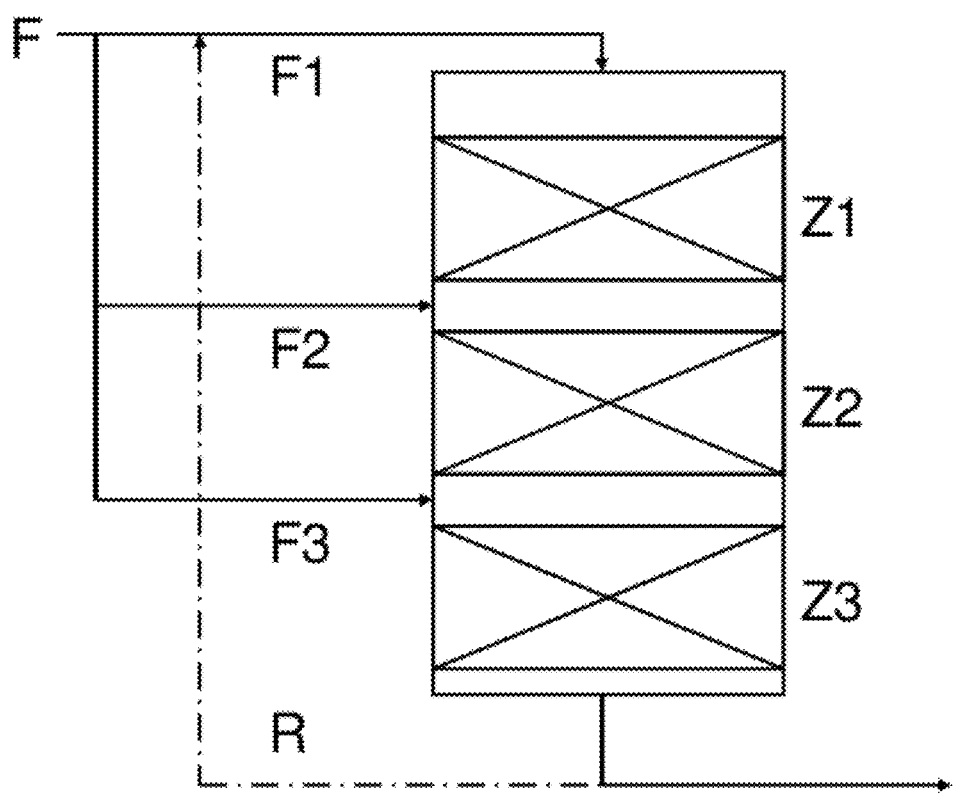
FIG. 2 represents details of a catalytic reactor of the invention.

The following definitions will now be given, to provide a better understanding of the present invention. They make reference to FIG. 2. The reactor comprises "n" catalytic zones. All of the flows are expressed as the flow rate by weight.

F: total flow of renewable feed treated in the process;

F1: part flow of feed introduced into the first catalytic zone Z1;

F2: part flow of feed introduced into the second catalytic zone Z2;

F3: part flow of feed introduced into the third catalytic zone Z3;

and so on . . .

Fn: part flow of feed introduced into the last catalytic zone Zn;

R: recycle flow, recycled to the first catalytic zone Z1.

The total recycle RT is defined as the ratio by weight of the recycle flow sent to the first catalytic zone Z1, R, and the total flow of the renewable feed, F:

$$RT=R/F$$

The local recycle RF1 is defined as the ratio by weight of the recycle flow sent to the first catalytic zone Z1, R, and the part flow of the feed introduced into the first catalytic zone 1, F1:

$$RF1=R/F1$$

Except during the process start-up phase, the diluting agent which is recycled to the catalytic zone Z1, and thus upstream of the first catalytic bed, is constituted by a portion of the liquid hydrocarbon product leaving the hydrotreatment section. In the remainder of the present description, this diluting agent recycled to the inlet to the first catalytic zone is also termed the liquid recycle or recycle and its flow rate is denoted R in the above definitions. The hydrotreatment section of the process is designed to completely convert the treated feeds, and so the liquid recycle produced is a flow of hydrocarbon which is free of oxygen, which means that its oxygen content is below the analytical detection limit and is essentially composed of paraffins. As a consequence, this liquid recycle is inert to hydrotreatment reactions and thus fulfills its role as diluent for the feed, meaning that the temperature rise in the first catalytic zone is limited due to the exothermic nature of the reactions occurring therein. Nevertheless, for a given capacity, i.e. for a given mass flow rate of treated feed, denoted F, the aim is to limit the quantity of liquid recycle injected into the first zone, denoted R, in order to limit the total flow rate of the flow supplied to said catalytic zone. This means that hydrotreatment reactors with dimensions comparable to those of the reactors for hydrotreatment of oil cuts such as gas oils can be used (thereby limiting costs), that pressure drops can be limited and that reactor choking phenomena can be avoided. In practice, in accordance with a preferred characteristic of the invention, the weight ratio between the recycle flow sent to the first catalytic zone Z1 (denoted R) and the total flow of treated renewable feed (denoted F), also termed the total recycle RT, is preferably less than 1.0, and more preferably less than 0.5, said flows being expressed as the mass flow rate.

It has been discovered that it is advantageous to inject the feed into various catalytic zones (mass flow rate F1 injected into zone Z1, F2 into zone Z2, etc), making sure thereby that increasing proportions of the feed are injected into the successive catalytic zones. This can be expressed as the following relationship:

F1/F less than or equal to F2/F, in turn less than or equal to F3/F, etc, and more generally F(n−1)/F is less than or equal to Fn/F, for the general case in which n is the number of catalytic zones employed.

The advantage of such a feed distribution in the various successive catalytic zones resides in the fact that the outlet temperatures for the various zones follow a rising profile, which means that sufficient temperatures can be obtained to reduce the residual quantities of nitrogen in the product leaving the various zones as much as possible, with the aim of retaining the catalytic activity of the downstream hydroisomerization section.

In particular, the Applicant has discovered that it is advantageous to inject a part flow of feed F1 into the first catalytic zone such that the weight ratio between the liquid recycle flow R injected into the inlet of the first catalytic zone Z1 and the part flow of feed injected into the inlet of the zone 1, F1, is 10.0 or higher, said flows being expressed as a mass flow rate. This ratio is also known as the local recycle. The use of such an arrangement of feed and liquid recycle flow rates means:

firstly, that a homogeneous temperature can be obtained in the entire section of the reactor at the outlet from zone Z1;

secondly, that a sufficient temperature can be obtained at the outlet from zone Z1, meaning that hydrodenitrogenation reactions can be triggered and residual quantities of nitrogen in the liquid hydrocarbon produced at the outlet from zone Z1 can therefore be reduced;

and that higher temperatures can be obtained at the outlet from the catalytic zones following zone Z1 (zones Z2 to Zn), which are sufficient to augment the nitrogen elimination percentages.

Introducing the feed in increasing proportions coupled with a large local recycle to the first zone means that, by using an increasing profile of temperatures, a sufficiently hot zone is obtained at the end of the catalytic zone to allow hydrodenitrogenation while keeping the temperature sufficiently low at the inlet to the catalytic zone to promote hydrodeoxygenation reactions. The local recycle ratio of 10 or more means that relatively little feed is injected onto the first zone, thereby allowing the remainder of the feed to be injected into the successive catalytic zones in greater and increasing proportions. The increase in the quantity of feed injected into the successive zones means that an increasing profile of inlet and outlet temperatures can be obtained for the various zones.

The flows entering the second catalytic zone are thus as follows:

unrefined feed injected into the inlet to zone Z2 (F2), such that the F2/F weight ratio is more than the weight ratio F1/F;

liquid recycle injected into the inlet to zone Z1, almost exclusively composed of paraffinic hydrocarbons which have passed through zone Z1;

effluent formed by conversion of the feed in the zone Z1, corresponding to the flow rate F1. The liquid hydrocarbons present in this effluent are free of oxygen and almost exclusively paraffinic hydrocarbons.

During start-up phases, a wide range of hydrocarbons may be injected such as, for example, a light gas oil, until a sufficient quantity of paraffinic product is available for recycling to the inlet to zone Z1.

The feed is supplied via the line 1, as seen in FIG. 1, while the hydrogen-rich gas is injected via the line 2. The feed is distributed into various flows F1, F2, . . . , Fn, supplying the various successive catalytic zones. The hydrogen-rich gas is distributed as the flow H1, H2, . . . , Hn. Feed flow F1 is mixed with gas flow H1; feed flow F2 is mixed with gas flow H2, and so on to the $n^{th}$ catalytic zone.

The temperature of the feed flow F1, F2, . . . , Fn is less than 150° C., preferably less than 100° C., and more preferably less than 80° C. It must be sufficient to allow a sufficient reduction in viscosity and thus adequate transfer from the storage tanks to the hydrotreatment reaction section. It is neither useful nor desirable to take the temperature of the feed to higher values in the absence of hydrogen, to avoid any degradation of the feeds as a result of polymerization or coking, for example.

In the same manner, the temperature of the hydrogen-rich gas which is mixed with the feed is as low as possible while being compatible with the operation of the process, since it is advantageous for the process to mix the feed with the hydrogen at low temperature in order to reduce the temperature by a quench effect applied to hydrocarbon products leaving the various catalytic zones. In practice, since the temperature rises when compressing hydrogen-rich gas, the hydrogen is frequently cooled after compression. Usually, the temperature of the hydrogen-rich gas is in the range 40° C. to 100° C., for example 50° C.

The temperature of the flow injected into the inlet to the catalytic zone Z1 (feed+liquid recycle constituted by a portion of the liquid product leaving the separation step b)) must be carefully regulated.

The temperature at the inlet to the catalytic zone Z1 must be a minimum of 180° C., preferably 200° C. in order to allow the reaction series to be triggered: reactions for eliminating oxygen in accordance with a mechanism that results in the formation of water, or in accordance with a decarboxylation/decarbonylation mechanism resulting in the formation of $CO_2$ and CO, but also hydrodenitrogenation reactions in at least a portion of said catalytic zone. This inlet temperature may be adjusted as a function of the nature of the feed. Advantageously, the temperature at the outlet from the zone Z1 is more than 250° C. The volume of the catalyst employed in said catalytic zone is adapted so that the conversion, i.e. the degree of elimination of oxygen, is complete at the outlet from said zone Z1.

The second flow of feed, F2, which represents a larger proportion of feed than that injected into the inlet to the zone Z1, is added at the outlet from the catalytic zone Z1. This feed injected into the inlet of zone Z2 may be strictly identical to that injected into the inlet to zone Z1, but also may be a feed of renewable origin but of a different nature. This flow of feed is supplemented by hydrogen-rich gas H2, and it is all injected into the reaction zone where it is mixed with the effluent from the zone Z1. This can reduce the temperature of the product formed at the outlet from the zone Z1 and the temperature at the inlet to zone Z2 is thus generally higher than that at the inlet to zone Z1. The same categories of reaction occur in the zone Z2 and the zone Z1, with slightly faster kinetics in the zone Z2 due to the higher mean temperature.

The same principle applies in the successive catalytic zones, with the flow of feed being added to the completely converted product formed in the subsequent catalytic zones.

As the feed is transformed into paraffinic hydrocarbons in a catalytic zone, the temperature increases in the zone, since hydrogenation and deoxygenation reactions are highly exothermic reactions. Thus, the temperature is sufficiently high towards the outlet of a catalytic zone to be able to carry out the hydrodenitrogenation reaction. The temperature at the outlet of at least one catalytic zone is preferably more than 300° C., more preferably more than 320° C.

The ratios between the hydrogen flows added to each of said flows F1, ..., Fn, and the feed mass flow rates F1, ..., Fn are of the same order of magnitude for the series of catalytic zones, the ratio between the flow rate of hydrogen and the flow rate of feed being in the range 300 to 1500 $Nm^3/m^3$, preferably in the range 600 to 900 $Nm^3/m^3$.

Optionally, it is possible to inject a complementary liquid flow between the catalytic zones if it is felt that there is a need to further dilute the feed.

In a preferred variation, valves for regulating the part flows of feed and hydrogen may be controlled by the temperatures at the inlets and outlets for the catalytic zones so as to adjust the feed part flow and hydrogen flow as well as the liquid recycle flow during operation. In this manner, the desired temperature at the inlet to the catalytic zones and in the catalytic zones is maintained. This is illustrated by the dotted lines in FIG. 1. Similarly, the temperature may be controlled by varying the temperature of the injected feed and/or hydrogen and/or the recycle (via the exchanger 14 in the reactor system (see above)).

The hydrotreatment reactor for the process of the invention may contain a variable number of catalytic zones. It normally comprises 3 to 10 catalytic zones, preferably in the range 3 to 6 catalytic zones. The term "catalytic zone" means a catalytic bed. Each catalytic zone may comprise one or more layers of catalysts, identical or different, optionally supplemented by inert layers. The catalytic zones may contain identical or different catalysts.

The type of catalyst used in the hydrotreatment section of this process is well known in the art.

Concerning active catalysts in the sulphide form, and treated unrefined feeds generally having limited sulphur contents (less than 100 ppm by weight in general, and usually less than 50 ppm by weight), it is sufficient to add a sulphur-containing compound such as dimethyldisulphide (DMDS) to the set of feed flows; under the temperature conditions in the hydrotreatment section, it decomposes into $H_2S$ and methane. This device means that the hydrotreatment catalysts used in the present process can be kept in their sulphide form and thus sufficient catalytic activity can be maintained throughout the cycle. Recommended injected DMDS contents are in the range 10 to 50 ppm by weight of sulphur equivalent with respect to the feed. In practice, adding DMDS corresponding to 50 ppm by weight sulphur of equivalent with respect to the feed is sufficient to retain the catalytic activity throughout the cycle.

The catalysts used in the hydrotreatment section of the process of the invention may be an association of the catalysts described below.

The hydrotreatment catalyst is a sulphurized catalyst which comprises one or more elements from groups 6, 8, 9 and 10 of the periodic classification of the elements, preferably nickel, molybdenum, tungsten and/or cobalt.

The fixed bed catalyst is advantageously a hydrotreatment catalyst comprising a hydrodehydrogenating function comprising at least one metal from group VIII and/or group VIB, used alone or as a mixture, and a support selected from the group formed by alumina, silica, silica-aluminas, magnesia, clays and mixtures of at least two of these minerals. Said support may also advantageously include other compounds, for example oxides selected from the group formed by boron oxide, zirconia, titanium oxide and phosphoric anhydride. The preferred support is an alumina support, highly preferably η, δ or γ alumina.

Said catalyst is advantageously a catalyst comprising metals from group VIII, preferably selected from nickel and cobalt, used alone or as a mixture, preferably in association with at least one metal from group VIB, preferably selected from molybdenum and tungsten, used alone or as a mixture. Preferably, a NiMo type catalyst is used.

The quantity of oxides of metals from group VIII, preferably nickel oxide, is advantageously in the range 0.5% to 10% by weight of nickel oxide (NiO), preferably in the range 1% to 5% by weight of nickel oxide, and the quantity of oxides of metals from group VIB, preferably molybdenum trioxide, is advantageously in the range 1% to 30% by weight of molybdenum oxide ($MoO_3$), preferably 5% to 25% by weight, the percentages being expressed as a % by weight with respect to the total catalyst mass.

The total quantity of oxides of metals from groups VIB and VIII in the catalyst used is advantageously in the range 5% to 40% by weight, preferably in the range 6% to 30% by weight with respect to the total catalyst mass.

The weight ratio, expressed as the metal oxide, of the metal (or metals) from group VIB to the metal (or metals) from group VIII is advantageously in the range 20 to 1, preferably in the range 10 to 2.

Said catalyst used in the hydrotreatment step of the process of the invention must advantageously be characterized by a strong hydrogenating power in order to orientate the selectivity of the reaction as far as possible towards a hydrogenation which maintains the number of carbon atoms of the fatty chains, i.e. the hydrodeoxygenation pathway, in order to maximize the yield of hydrocarbons in the gas oil and/or kerosene distillation range. For this reason, it is preferable to operate at a relatively low temperature. Maximizing the hydrogenating function also means that polymerization and/or condensation reactions leading to the formation of coke, which would degrade the stability of the catalytic performances, are limited.

Said catalyst used in the hydrotreatment step of the process of the invention may also advantageously contain a doping element selected from phosphorus and boron, used alone or as a mixture. Said doping element may be introduced into the matrix or, as is preferable, be deposited on the support. It is also possible to deposit silicon onto the support, alone or with phosphorus and/or boron and/or fluorine.

The quantity by weight of the oxide of said doping element is advantageously less than 20%, preferably less than 10%, and it is advantageously at least 0.001% with respect to the total catalyst mass.

In a preferred variation, the catalysts used are like those described in application FR 2 943 071, describing catalysts with high selectivity for hydrodeoxygenation reactions. That application describes bulk or supported catalysts comprising an active phase constituted by at least one element from group VIB and at least one element from group VIII, said element from group VIB being selected from molybdenum and tungsten; preferably, said element from group VIB is molybdenum and said element from group VIII is selected from nickel and cobalt; preferably, said element from group VIII is nickel, with said elements being in the sulphide form, with the atomic ratio of the metal (or metals) from group VIII to the metal (or metals) from group VIB being strictly more than 0 and less than 0.095, preferably in the range 0.01 to 0.05, and more preferably in the range 0.01 to 0.03.

In the case in which said catalyst is in the supported form, the quantity of the oxide of the element from group VIB is advantageously in the range 1% to 30% by weight with respect to the total catalyst mass, and the quantity of the oxide of the element from group VIII is advantageously strictly more than 0 and less than 1.5% by weight with respect to the total catalyst mass.

In the case in which said catalyst is in the bulk form, the quantities of the oxide of elements from groups VIB and VIII are defined by the atomic ratios of the metal (or metals) from group VIII to the metal (or metals) from group VIB as defined in the invention. For an atomic ratio of metal (or metals) from group VIII to metal (or metals) from group VIB of strictly more than 0 and less than 0.095, the quantity of element from group VIB is advantageously more than 95.3% and strictly less than 100% by weight of the oxide equivalent of the element from group VIB, and the quantity of the element from group VIII is advantageously strictly more than 0 and less than 4.7% by weight of the oxide equivalent of the element from group VIII.

The supports used in the application FR 2 943 071 are identical to those described above; preferably, it is constituted exclusively by alumina.

The catalyst may also advantageously contain at least one doping element in order to obtain a high degree of conversion while maintaining the reaction selectivity for the hydrodeoxygenation pathway. The active phase in the case in which said catalyst is in the bulk form and/or the support in the case in which said catalyst is in the supported form may thus advantageously contain at least one doping element selected from phosphorus, fluorine and boron; preferably, the doping element is phosphorus. The skilled person will be aware that these elements have indirect effects on catalytic activity: a better dispersion of the sulphided active phase and an increase in the acidity of the catalyst promotes hydrotreatment reactions (Sun et al, Catalysis Today, 86 (2003), 173).

The quantity of doping element, preferably phosphorus, is advantageously strictly more than 1% and less than 8% by weight of the oxide $P_2O_5$ with respect to the total catalyst mass, preferably more than 1.5% and less than 8% and highly preferably more than 3% and less than 8% by weight.

In accordance with another preferred variation, catalysts are used such as those described in application FR 2 940 144 describing supported or bulk catalysts comprising an active phase constituted by a sulphur-containing element from group VIB, the element from group VIB being molybdenum; in the case in which the catalyst is a supported catalyst, it has a quantity of the element from group VIB in the range 17% to 35% by weight of the oxide of said element from group VIB with respect to the total catalyst mass and also comprises a doping element selected from phosphorus, boron and silicon, deposited on said support. Said catalysts have a very high selectivity for hydrodeoxygenation reactions and can be used to limit the decarboxylation/decarbonylation reactions and thus limit the disadvantages caused by the formation of oxides of carbon. These catalysts are preferably used in at least the first catalytic zone.

In the case in which that catalyst is supported, it advantageously comprises a support as described above; preferably, it is exclusively constituted by alumina.

In the case in which said catalyst is in the supported form, the quantity of the element from group VIB is advantageously in the range 18% to 33% by weight, more preferably in the range 20% to 32% by weight of the oxide of the element from group VIB with respect to the total catalyst mass.

In the case in which said catalyst is in the supported form, said catalyst also comprises at least one doping element selected from phosphorus, fluorine and boron; preferably, the doping element is phosphorus, in order to produce a degree of conversion which is high while maintaining the selectivity for the hydrodeoxygenation reaction. The quantity of doping element, said doping element preferably being phosphorus, is advantageously strictly more than 0.5% and less than 8% by weight of the oxide $P_2O_5$ with respect to the total catalyst mass, preferably more than 1% and less than 8%, and highly preferably more than 3% and less than 8% by weight.

This catalyst may alternatively be in the bulk form; in this case, said catalyst does not contain a support.

In the case in which said catalyst is in the bulk form, the quantity of the element from group VIB is advantageously in the range 92% to 100% by weight of the oxide of the element from group VIB with respect to the total catalyst mass, preferably more than 92% and strictly less than 99.5% by weight, preferably in the range 92% to 99% by weight and highly preferably in the range 92% to 97% by weight.

In the case in which said catalyst is in the bulk form, the catalyst of the invention may also advantageously contain at least one doping element selected from phosphorus, fluorine and boron; preferably, the doping element is phosphorus. The quantity of doping element, said doping element preferably being phosphorus, is advantageously strictly more than 0.5% and less than 8% by weight of the oxide $P_2O_5$ with respect to the total catalyst mass, preferably more than 1% and less than 8% and highly preferably more than 3% and less than 8% by weight.

The context of the present invention also encompasses the use, in the hydrotreatment step of the process of the invention, simultaneously or successively, of a single catalyst or a plurality of different catalysts in the catalytic zones.

In the context of the invention, it is thus possible to maintain an overall conversion of the feed originating from a renewable source, i.e. a conversion by hydrodeoxygenation and decarboxylation/decarbonylation together, which is advantageously 90% or more; preferably, the overall conversion of the feed is equal to 100%, while maximizing the yield of hydrodeoxygenation product or the conversion by hydrodeoxygenation which, in accordance with the invention, remains at 50% or higher.

In the case in which catalysts with a high selectivity for HDO (as described above) are used, the conversion by hydrodeoxygenation is 90% or higher, preferably 95% or higher and more preferably 96% or higher. In this case, the conversion by decarboxylation/decarbonylation or decomposition/decarbonylation product yield from the feed from transcutaneous sources is advantageously limited to at most 10%, preferably limited to at most 5% and more preferably to at most 4%.

The hydrodeoxygenation reaction results in the formation of water by consuming hydrogen and forming hydrocarbons with the same number of carbon atoms as in the initial fatty acid chains. The effluent from the hydrodeoxygenation reactions comprises even-numbered hydrocarbons such as C14 to C24 hydrocarbons and are vastly in the majority compared with the odd-numbered hydrocarbons such as C15 to C23 obtained by decarboxylation/decarbonylation reactions. The selectivity for the hydrodeoxygenation pathway is demonstrated by measuring the total yield of hydrocarbons containing even numbers of carbon atoms and the total yield of hydrocarbons containing an odd number of carbon atoms in the liquid fraction which can be upgraded to fuel. The yields of even and odd numbered hydrocarbons providing access to the reaction selectivity (HDO/decarboxylation/decarbonylation) are obtained by gas chromatographic analysis of the liquid effluents from the reaction which can be upgraded to fuel. The gas chromatographic analysis technique is a method which is known to the skilled person.

Unless otherwise indicated, the process of the invention is operated under hydrotreatment conditions which are generally known in the art (see, for example, patent EP 1 741 768). The total pressure is generally in the range 20 to 150 bar (2 MPa to 15 MPa), preferably in the range 50 to 100 bar (5 MPa to 10 MPa).

As indicated above, the hydrogen is used in excess. In the process of the invention, the ratio between the flow rate of hydrogen and the flow rate of unrefined feed is in the range 300 to 1500 $Nm^3/m^3$, preferably in the range 600 to 900 $Nm^3/m^3$.

A satisfactory operation of the process of the invention results in an overall HSV (defined as the ratio between the total volume flow rate of the treated unrefined feed and the total volume of the catalyst in the hydrotreatment section) in the range 0.1 to 5.0 $h^{-1}$, preferably in the range 0.1 to 1.5 $h^{-1}$.

The temperatures used in the various zones of the hydrotreatment section have to be carefully controlled in order to avoid, as far as possible, unwanted reactions such as:
 feed polymerization reactions, which lead to the deposition of coke and thus to deactivation of the catalyst;
 decarboxylation/decarbonylation reactions, resulting in a loss of middle distillate yield;
and at the same time to carry out total conversion of the feed both as regards elimination of oxygen-containing compounds and as regards elimination of nitrogen-containing compounds. In general, the process of the invention operates at a temperature in the range 200° C. to 400° C. Introducing the feed in increasing proportions coupled with a substantial recycle to the first catalytic zone means that an increasing temperature profile can be obtained at the inlet to the zones and also at the outlet from the zones.

The temperature at the inlet to zone Z1 must be more than 180° C., preferably more than 200° C. The temperatures at the inlet to the subsequent catalytic zones must be higher than that at the inlet to the preceding zone, generally less than 300° C. and preferably less than 280° C.

The temperature at the outlet from at least one catalytic zone is preferably more than 300° C., preferably more than 320° C. The temperatures at the outlet from each of the catalytic zones must preferably be less than 400° C., more preferably less than 380° C., in order to limit deactivation of the catalyst by coking.

The process of the invention uses fixed trickle bed reactors which are known to the skilled person. The reagents (feed and hydrogen) are introduced into the reactor as a descending co-current flow from the top to the bottom of the reactor. Examples of such reactors are described in the document U.S. Pat. No. 7,070,745.

Between each catalytic zone, it is possible to inject supplemental hydrogen in order to profit from a quench effect and to obtain the desired temperatures at the inlet to the next catalytic zone. Thus, quench boxes may be installed between each catalytic zone in order to ensure optimum temperature homogeneity over the whole section of the reactor, and for all of the catalytic zones.

In the same manner, distributors may be installed between each catalytic zone in order to guarantee a homogeneous supply of the liquid feed over the whole section of the reactor, and for all of the catalytic zones.

One advantage of the process of the invention consists in its great flexibility depending on the origin of the feed. Feeds which differ, in particular in the various degrees of unsaturation of the hydrocarbon chains, may be completely converted both as regards the elimination of oxygen (which leads to maximum efficiency of dilution of the unrefined feed in the next zone) and as regards the elimination of nitrogen (which leads to better function of the downstream hydroisomerization step).

Optionally, the process may also convert feeds from renewable sources mixed with oil cuts such as gas oils, kerosenes, or even gasolines from oil refining processes. Preferably, the oil cuts are oil feeds of the middle distillate type selected from the group formed by straight run gas oils and/or kerosenes and gas oils and/or kerosenes from conversion processes, or any mixture thereof.

Preferably, the oil cuts are selected from the group formed by straight run atmospheric gas oils, gas oils from conversion processes such as those derived from coking, for example, from fixed bed hydroconversion (such as those from HYVAHL® processes which treat heavy feeds and was developed by the Applicant) or ebullated bed hydrotreatment processes for heavy feeds (such as those derived from H-OIL® processes) or solvent deasphalted oils (for example using propane, butane or pentane) from deasphalting straight run vacuum distillation residue, or residues derived from heavy feed conversion processes such as HYVAHL® or H-OIL®. The feeds may also advantageously be formed by mixing these various fractions. They may also advantageously contain light gas oil or kerosene cuts with a distillation profile from approximately 100° C. to approximately 370° C. They may also advantageously contain aromatic extracts and paraffins obtained in the context of the manufacture of lubricating oils.

In this case, the quantity of liquid recycle sent to the first catalytic zone of the hydrotreatment section may be greatly reduced or even dispensed with, since these flows of oil feeds then result from their treatment with hydrogen, with less heat being released than when feeds of renewable origin comprising substantial quantities of oxygen are used.

Separation

The liquid product formed in the last catalytic zone is withdrawn in the line 11 and then undergoes at least one separation step in order to separate a gaseous fraction containing hydrogen, CO, $CO_2$, $H_2S$, water and light gases and a liquid fraction containing the paraffinic hydrocarbons.

In a variation, the separation may be carried out in a single step using a high pressure high temperature separator 8 operating without reduction of pressure at a temperature in the range 145° C. to 280° C.

In another variation, the separation step comprises separation in two stages without pressure reduction, the first separation being carried out between 145° C. and 280° C. in a high temperature separator 8, the second being carried out in the range 25° C. to 100° C. in a low temperature separator 9. In a preferred implementation, the condensate from the fraction obtained from the second separation step is introduced into a degassing receptacle 12.

Preferably, the liquid effluent from the preceding gas/liquid separation then undergoes a separation of at least a portion, preferably all, of the remaining water which has been formed, from at least one liquid hydrocarbon base, the water having been produced during the hydrodeoxygenation reactions.

The aim of this step is to separate water from the liquid hydrocarbon effluent. The term "elimination of water" means elimination of the water produced by the hydrodeoxygenation (HDO) reactions. The more or less complete elimination of water is advantageously a function of the tolerance to water of the hydroisomerization catalyst used in the optional subsequent step of the process of the invention. The water may be eliminated using any method and technique which is known to the skilled person, such as by drying, passage over a dessicant, flash, solvent extraction, distillation or decanting, for example, or by combining at least two of these methods.

Optionally, a final step for purification of the various pollutants may be carried out using methods which are known to the skilled person, such as by steam stripping or nitrogen stripping or by coalescence and/or using a capture mass, for example.

The portion of liquid effluent 10 which is not recycled for addition to the feed flow injected into the zone Z1 as a liquid recycle R is sent either directly to the pool for incorporation into the gas oil pool or directly to the optional hydroisomerization (HIS) section, in order to produce kerosene and/or gas oil bases. The liquid effluent is sufficiently denitrogenated to maintain the catalytic activity of the hydroisomerization section. A hydrodenitrogenation reactor between the hydrotreatment and hydroisomerization is not necessary.

Hydroisomerization

In accordance with a preferred implementation, at least a portion of the liquid fraction 10 containing the paraffinic hydrocarbons obtained at the end of the preceding separation step is hydroisomerized in the presence of a hydroisomerization catalyst. The hydroisomerization catalysts used are advantageously bifunctional in type, i.e. they have a hydrodehydrogenating function and a hydroisomerizing function.

Said hydroisomerization catalyst advantageously comprises at least one metal from group VIII and/or at least one metal from group VIB as a hydrodehydrogenating function and at least one molecular sieve or an amorphous mineral support as the hydroisomerizing function.

Said hydroisomerization catalyst advantageously comprises either at least one noble metal from group VIII, preferably selected from platinum and palladium, which are active in their reduced form, or at least one metal from group VIB, preferably selected from molybdenum and tungsten, in combination with at least one non-noble metal from group VIII, preferably selected from nickel and cobalt, preferably used in their sulphurized form.

In the case in which the hydroisomerization catalyst comprises at least one noble metal from group VIII, the total quantity of noble metal of the hydroisomerization catalyst is advantageously in the range 0.01% to 5% by weight with respect to the finished catalyst, preferably in the range 0.1% to 4% by weight and more preferably in the range 0.2% to 2% by weight.

Preferably, the hydroisomerization catalyst comprises platinum or palladium; more preferably, the hydroisomerization catalyst comprises platinum. The metallic hydrodehydrogenating function may advantageously be introduced onto said catalyst using any method which is known to the skilled person, such as co-mixing, dry impregnation, or exchange impregnation.

In the case in which the hydroisomerization catalyst comprises at least one metal from group VIB in combination with at least one non-noble metal from group VIII, the quantity of metal from group VIB of the hydroisomerization catalyst is advantageously in the range, as the oxide equivalent, 5% to 40% by weight with respect to the finished catalyst, preferably in the range 10% to 35% by weight and highly preferably in the range 15% to 30% by weight, and the quantity of the metal from group VIII of said catalyst is advantageously in the range, as the oxide equivalent, 0.5% to 10% by weight with respect to the finished catalyst, preferably in the range 1% to 8% by weight and more preferably in the range 1.5% to 6% by weight. Preferably, the hydroisomerization catalyst comprises NiW.

In accordance with a preferred implementation, said hydroisomerization catalyst comprises at least one amorphous mineral support as a hydroisomerization function, said amorphous mineral support being selected from aluminas doped with fluorine and/or chlorine, silica-aluminas and aluminosilicates, preferably silica-aluminas. Highly preferably, the catalyst comprises NiW on silica-alumina.

In accordance with another preferred implementation, said hydroisomerization catalyst comprises at least one molecular sieve, preferably at least one zeolitic molecular sieve and more preferably at least one mono-dimensional 10 MR zeolitic molecular sieve as the hydroisomerizing function.

Zeolitic molecular sieves are defined in the "Atlas of Zeolite Structure Types", W M Meier, D H Olson and Ch Baerlocher, $5^{th}$ revised edition, 2001, Elsevier, to which the present application also makes reference. The zeolites therein are classified by the size of their pore or channel openings.

Mono-dimensional 10 MR zeolitic molecular sieves have pores or channels with an opening which is defined by a ring containing 10 oxygen atoms (10 MR opening). The channels of the zeolitic molecular sieve with a 10 MR opening are advantageously mono-dimensional non-interconnecting channels which open directly to the exterior of said zeolite. The mono-dimensional 10 MR zeolitic molecular sieves present in said hydroisomerization catalyst advantageously comprise silicon and at least one element T selected from the group formed by aluminium, iron, gallium, phosphorus and boron, preferably aluminium. The Si/Al ratios of the zeolites described above are advantageously those obtained on synthesis or obtained after post-synthesis dealumination treatments which are well known to the skilled person, non-exhaustive examples of which are hydrothermal treatments which may or may not be followed by acid attacks, or direct acid attacks using solutions of mineral or organic acids. Preferably, they are practically completely in the acid form, i.e. the atomic ratio between the monovalent compensating cation (for example sodium) and the element T inserted in the crystalline framework of the solid is advantageously less than 0.1, preferably less than 0.05 and more preferably less than 0.01. Thus, the zeolites in the composition of said selective hydroisomerization catalyst are advantageously calcined and exchanged by at least one treatment with a solution of at least one ammonium salt in order to obtain the ammonium form of the zeolites which, once calcined, result in the acid form of said zeolites.

Said mono-dimensional 10 MR zeolitic molecular sieve of said hydroisomerization catalyst is advantageously selected from zeolitic molecular sieves with structure type TON, such as NU-10, FER, such as ferrierite, EUO, selected from EU-1 and ZSM-50, used alone or as a mixture, or the zeolitic molecular sieves ZSM-48, ZBM-30, IZM-1, COK-7, EU-2 and EU-11, used alone or as a mixture. Preferably, said mono-dimensional 10 MR zeolitic molecular sieve is selected from the zeolitic molecular sieves ZSM-48, ZBM-30, IZM-1 and COK-7, alone or as a mixture, and more preferably from the zeolitic molecular sieves ZSM-48 and ZBM-30, used alone or as a mixture. Highly preferably, said mono-dimensional 10 MR zeolitic molecular sieve is ZBM-30 and still more preferably, ZBM-30, synthesized with the organic template triethylenetetramine.

Preferably, the hydroisomerization catalyst comprises a metallic active phase constituted by platinum and a hydroisomerization function based on ZBM-30; more preferably, the hydroisomerization catalyst comprises a metallic active phase constituted by platinum and a hydroisomerization function based on ZBM-30 synthesized with the organic template triethylenetetramine.

The zeolite ZBM-30 is described in patent EP 0 046 504, and the zeolite COK-7 is described in patent applications EP 1 702 888 and FR 2 882 744. The zeolite IZM-1 is described in patent application FR 2 911 866. The zeolite with structure type TON is described in the work "Atlas of Zeolite Structure Types" cited above and NU-10 zeolite is described in patents EP 0 065 400 and EP 0 077 624. The zeolite with structure type FER is described in the work "Atlas of Zeolite Structure Types" cited above.

The quantity of mono-dimensional 10 MR zeolitic molecular sieve is advantageously in the range 5% to 95% by weight, preferably in the range 10% to 90% by weight, more preferably in the range 15% to 85% by weight and still more preferably in the range 20% to 80% by weight with respect to the finished catalyst.

Preferably, said hydroisomerization catalyst also comprises a binder constituted by a porous mineral matrix. Said binder may advantageously be used during the step for shaping said hydroisomerization catalyst.

Preferably, shaping is carried out with a binder constituted by a matrix containing alumina, into any shape which is known to the skilled person, and more preferably with a matrix containing gamma alumina.

The hydroisomerization catalysts obtained are advantageously shaped into the form of grains with various shapes and dimensions. They are in general used in the form of cylindrical or polylobed extrudates such as bilobes, trilobes, or polylobes with a straight or twisted shape, but may optionally be manufactured and used in the form of crushed powders, tablets, rings, beads or wheels. Other extrusion techniques such as pelletization or bowl granulation may advantageously be used.

In the case in which the hydroisomerization catalyst contains at least one noble metal, the noble metal contained in said hydroisomerization catalyst should advantageously be reduced. One preferred method for carrying out reduction of the metal is treatment in hydrogen at a temperature in the range 150° C. to 650° C. and at a total pressure in the range 1 to 250 bar (0.1 MPa to 25 MPa). As an example, a reduction consists of a constant temperature stage at 150° C. lasting two hours then raising the temperature to 450° C. at a rate of 1° C./min followed by a two hour constant temperature stage at 450° C.; throughout this reduction step, the hydrogen flow rate is 1000 normal $m^3$ of hydrogen/$m^3$ of catalyst and the total pressure is kept constant at 1 bar. Any ex situ reduction method may advantageously be envisaged.

In the hydroisomerization step, the feed is advantageously brought into contact with said hydroisomerization catalyst in the presence of hydrogen at operating temperatures and pressures that can advantageously be used to carry out hydroisomerization of the feed and limit cracking, i.e. by limiting the production of the 150° C.$^-$ fraction.

Thus, the optional hydroisomerization step of the process of the invention advantageously operates at a temperature in the range 150° C. to 500° C., preferably in the range 150° C. to 450° C., and highly preferably in the range 200° C. to 450° C., at a pressure in the range 1 MPa to 10 MPa, preferably in the range 2 MPa to 9 MPa and highly preferably in the range 3 MPa to 7 MPa, at an hourly space velocity which is advantageously in the range 0.1 $h^{-1}$ to 10 $h^{-1}$, preferably in the range 0.2 $h^{-1}$ to 7 $h^{-1}$ and more preferably in the range 0.5 $h^{-1}$ to 5 $h^{-1}$, and at a hydrogen flow rate such that the volume ratio of hydrogen/hydrocarbons is advantageously in the range 70 to 1000 $Nm^3/m^3$ of feed, preferably in the range 100 to 1000 normal $m^3$ of hydrogen per $m^3$ of feed and highly preferably in the range 150 to 1000 normal $m^3$ of hydrogen per $m^3$ of feed.

Preferably, the optional hydroisomerization steps operates in co-current mode.

Fractionation

At least a portion, preferably all, of the hydroisomerized effluent then advantageously undergoes one or more separations.

The fractionation step may comprise flash separation to separate the gas from the liquid and/or atmospheric distillation. Preferably, the fractionation step comprises atmospheric distillation. The aim of this step is to separate the gases from the liquid, and in particular to recover the hydrogen-rich gases which may also contain light compounds such as the $C_1$-$C_4$ cut, a gasoline cut (150° C.$^-$) and at least one middle distillates cut (150° C.$^+$) containing kerosene and/or gas oil.

Upgrading the gasoline (or naphtha) cut is not the aim of the present invention, but this cut may advantageously be sent to a steam cracking unit for the production of hydrogen or for catalytic reforming. The hydrogen produced thereby may be injected into the hydrotreatment and/or optional hydroisomerization step.

The middle distillates cut which represents the desired fuel bases may comprise a cut containing gas oil and kerosene, or the two cuts may be recovered separately. These products are based on renewable sources and do not contain sulphur-containing compounds.

At least a portion of the middle distillate cut or cuts may be recycled to the hydrotreatment step as a recycle.

In a variation, at least a portion of the 150° C.$^+$ cut may be recycled to the hydroisomerization step. This fraction thus undergoes isomerization once again, meaning that cold properties can be improved.

In another variation, at least a portion of the 300° C.$^+$ fraction may be recycled to the hydroisomerization step. Thus, this fraction undergoes isomerization once again, which means that this cut can be upgraded into lighter products and cold properties can be improved.

In another variation, at least a portion of the 150° C.$^+$ cut may be recycled to the hydrotreatment step.

The hydrogen-containing gas 13 which has been separated during the separation step from the hydrodeoxygenation process of the invention and/or the optional hydroisomerization step is, if necessary, advantageously treated at least in part to reduce its light compound content (C1 to C4). Similarly, it advantageously undergoes one or more intermediate purification treatments, preferably at least one wash with at least one amine, preferably followed by methanation and/or separation by pressure swing adsorption, PSA, before being recycled.

Advantageously, recycle hydrogen, preferably purified, may be introduced either with the feed entering the hydrodeoxygenation step of the invention and/or into the optional hydroisomerization step, or in the form of quench hydrogen between the beds of the hydrodeoxygenation catalysts of the invention and/or the beds of hydroisomerization catalysts.

It is also advantageous to supplement the recycle gas with a certain quantity of sulphur-containing compound (such as DMDS, dimethyldisulphide), which produces hydrogen sulphide, $H_2S$, upon thermal decomposition. This device can be used if necessary to maintain the catalyst of the hydrotreatment step and/or the optional hydroisomerization step (in the case of an active catalyst in the sulphide form) in the sulphurized condition.

EXAMPLE 1

Not in Accordance with the Invention

The feed to be treated was a rapeseed oil with the principal characteristics shown in Table 1a.

TABLE 1a

Characteristic of treated feed (rapeseed vegetable oil)

| Feed treated | Rapeseed oil |
|---|---|
| Density at 15° C. (kg/m$^3$) | 920.0 |
| Oxygen (wt %) | 11.0 |
| Hydrogen (wt %) | 11.4 |
| Sulphur (ppm by weight) | 4 |
| Nitrogen (ppm by weight) | 23 |
| Phosphorus (ppm by weight) | 10 |

100 g/h of this feed was to be treated in a hydrotreatment reactor constituted by 3 catalytic beds.

Each catalytic zone was constituted by one bed of catalyst. The catalyst used was identical in the three catalytic zones of the hydrotreatment step and comprised 4% by weight of NiO, 21% by weight of MoO$_3$ and 5% by weight of P$_2$O$_5$ supported on a gamma alumina. Said catalyst had a Ni/Mo atomic ratio of 0.4.

The supported catalysts were prepared by dry impregnation of the oxide precursors in solution then sulphurized in situ prior to the test, at a temperature of 350° C., using a straight run gas oil feed supplemented with 2% by weight of sulphur from dimethyldisulphide (DMDS). After in situ sulphurization in the unit under pressure, the feed from a renewable source constituted by rapeseed oil described in Table 1a was sent to each of the three catalytic zones.

In order to keep the catalyst in the sulphide state, 50 ppm by weight of sulphur in the form of DMDS was added to the feed. Under the reaction conditions, the DMDS was completely decomposed to form methane and H$_2$S.

The method for preparing the catalysts does not limit the scope of the invention.

The quantity of recycle liquid used and injected with the unrefined feed onto zone Z1 was 100 g/h, which resulted in a total mass recycle ratio of 1.0.

The total operating pressure was 50 bar relative (5 MPa relative). Pure hydrogen was mixed with each of the flows of the feed, at a flow rate such that at the inlet to each of the catalytic zones, the H$_2$/unrefined feed ratio was 700 Nm$^3$/m$^3$.

Table 1b indicates the flow rates for each of the three feed flows, as well as the diluent/feed ratio for each of the 3 catalytic zones.

TABLE 1b

Operating conditions for hydrotreatment section and characteristics of effluent produced

| | |
|---|---|
| Feed flow rate, zone Z1 (F1) (g/h) | 25.0 |
| Feed flow rate, zone Z2 (F2) (g/h) | 30.0 |
| Feed flow rate, zone Z3 (F3) (g/h) | 45.0 |
| Total feed flow rate (F) (g/h) | 100.0 |
| Liquid recycle flow rate (R) (g/h) | 100.0 |
| Diluent/feed ratio, zone Z1 (g/g) | 4.0 |
| Diluent/feed ratio, zone Z2 (g/g) | 4.0 |
| Diluent/feed ratio, zone Z3 (g/g) | 3.5 |
| Inlet temperature, zone Z1 (° C.) | 203 |
| Outlet temperature, zone Z3 (° C.) | 284 |
| Characteristics of effluent produced | |
| Flow rate of hydrocarbons produced (g/h) | 86.0 |
| Density at 15° C. (kg/m$^3$) | 790 |
| Oxygen (% by weight) | <0.2 |
| Nitrogen (ppm by weight) | 5 |

The experiment was carried out in this case by maintaining a near-identical degree of dilution on all of the catalytic zones of close to 4 g of diluent per 1 g of unrefined feed. The hydrocarbon produced at the outlet from the hydrotreatment section contained traces of nitrogen (5 ppm by weight).

The liquid hydrocarbon produced above was then injected into a reactor containing 100 cm$^3$ of a hydroisomerization catalyst composed of NiW/SiAl.

The hydrocarbon was injected at a volume flow rate of 100 cm$^3$/g, i.e. a HSV in the hydroisomerization section of 1.0 h$^{-1}$.

The hydroisomerization step was carried out on a fixed catalyst bed using a pressure of 50 bar relative (5 MPa relative) and a flow rate of pure hydrogen such that the ratio between the volume flow rate of hydrogen and the volume flow rate of liquid hydrocarbon was 700 Nm$^3$/m$^3$. Thus, at the outlet for the C$_4^-$ gases, a naphtha cut (C5-150° C.), and a kerosene cut (150° C.$^+$) were obtained. Table 1c provides the characteristic of this kerosene cut.

TABLE 1c

Characteristics of kerosene cut produced

| | |
|---|---|
| Density at 15° C. (kg/m$^3$) | 780.1 |
| D86 initial point (° C.) | 160 |
| D86 end point (° C.) | 305 |
| Nitrogen (ppm by weight) | <0.3 |
| Freezing point (° C.) | −5 |
| Flash point (° C.) | 50 |

EXAMPLE 2

In Accordance with the Invention

The same unrefined feed as in the preceding example (rapeseed oil) was treated. The catalyst and its preparation were identical to that described in Example 1. The operating conditions for the hydrotreatment section were identical to those used in Example 1.

Strictly the same quantity of recycle liquid injected with the unrefined feed was used, i.e. 100 g/h, which meant that the total recycle ratio by weight was identical and equal to 1.0.

In contrast, the operation was carried out such that on the first catalytic zone, there was a very high degree of dilution between the recycle and the feed injected into the catalytic zone Z1. This ratio was 11 g of liquid recycle per 1 g of unrefined feed injected into zone Z1. Table 2b indicates the flow rates of each of the three flows of feed as well as the diluent/unrefined feed ratios for each of the 3 catalytic zones.

TABLE 2b

Operating conditions for hydrotreatment section and characteristics of effluent produced

| | |
|---|---|
| Feed flow rate, zone Z1 (F1) (g/h) | 9.0 |
| Feed flow rate, zone Z2 (F2) (g/h) | 36.0 |
| Feed flow rate, zone Z3 (F3) (g/h) | 55.0 |
| Total feed flow rate (F) (g/h) | 100.0 |
| Liquid recycle flow rate (R) (g/h) | 100.0 |
| Diluent/feed ratio, zone Z1 (g/g) | 11.1 |
| Diluent/feed ratio, zone Z2 (g/g) | 3.0 |
| Diluent/feed ratio, zone Z3 (g/g) | 2.6 |
| Inlet temperature, zone Z1 (° C.) | 203 |
| Outlet temperature, zone Z3 (° C.) | 317 |
| Characteristics of effluent produced | |
| Flow rate of hydrocarbons produced (g/h) | 86.0 |
| Density at 15° C. (kg/m$^3$) | 790 |
| Oxygen (% by weight) | <0.2 |
| Nitrogen (ppm by weight) | <0.3 |

As a consequence, better temperature homogeneity was obtained at the outlet from zone Z1. The proportions for the feed injected into the subsequent zones were higher than in Example 1, and the temperature profile was modified therein such that the residual nitrogen content in the liquid hydrocarbon produced by the hydrotreatment section was below the detection limit, i.e. less than 0.3 ppm by weight.

This liquid hydrocarbon was then treated in a hydroisomerization reactor and under strictly identical operating conditions to those described in Example 1. Thus, at the outlet for the C4⁻ gases, a naphtha cut (C5-150° C.) and a kerosene cut (150° C.⁺) were obtained.

Table 2c provides the characteristics of this kerosene cut produced under these conditions.

TABLE 2c

Characteristics of kerosene cut produced

| | |
|---|---|
| Density at 15° C. (kg/m³) | 764.5 |
| D86 initial point (° C.) | 160 |
| D86 end point (° C.) | 295 |
| Nitrogen (ppm by weight) | <0.3 |
| Freezing point (° C.) | −50 |
| Flash point (° C.) | 50 |

It will be observed that the freezing point for the kerosene cut produced in accordance with the present invention satisfies specifications requiring a freezing point below −47° C.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 10/05027, filed Dec. 22, 2010, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the hydrotreatment of a feed originating from renewable sources producing paraffinic hydrocarbons in the presence of hydrogen in excess of the theoretical hydrogen consumption and under hydrotreatment conditions in a fixed bed reactor having a plurality of catalytic zones disposed in series and comprising a hydrotreatment catalyst, wherein:
a) a total feed flow F is divided into a certain number of part flows F1 to Fn equal to the number of catalytic zones n in the reactor, a first part flow F1 is injected into a first catalytic zone, a second part flow F2 is injected into a second catalytic zone up to n catalytic zones, if n is greater than 2;
the part flows are injected into successive catalytic zones in increasing proportions such that F1/F is less than or equal to F2/F, which itself is less than or equal to F3/F until F(n−1)/F is less than or equal to Fn/F, in order to produce an effluent containing paraffinic hydrocarbons;
b) said effluent undergoes at least one separation in order to separate a gaseous fraction containing hydrogen, CO, $CO_2$, $H_2S$, water and light gases and a liquid fraction containing the paraffinic hydrocarbons;
c) at least a portion of said liquid fraction containing paraffinic hydrocarbons is recycled to the first catalytic zone such that the weight ratio between said recycle sent to the first catalytic zone and the part flow F1 introduced into the first catalytic zone is 10 or more.

2. A process according to claim 1, in which the excess hydrogen used in the hydrotreatment step is at least 50% of the theoretical consumption.

3. A process according to claim 1, in which the weight ratio between the recycle sent to the first catalytic zone and total flow of the feed is less than 1.

4. A process according to claim 1, in which the reactor comprises 3 to 10 catalytic zones.

5. A process according to claim 1, in which the hydrotreatment is operated at a temperature of 200° C. to 400° C., a total pressure of 2 MPa to 15 MPa, at an hourly space velocity of 0.1 h⁻¹ to 5 h⁻¹ and in the presence of a total quantity of hydrogen mixed with the feed such that the hydrogen/feed ratio is in the range 300 to 1500 Nm³ of hydrogen/m³ of feed.

6. A process according to claim 1, in which the hydrotreatment catalyst is a sulphurized catalyst which comprises one or more elements from groups 6, 8, 9 and 10 of the periodic classification of the elements.

7. A process according to claim 1, in which separation b) is carried out using a high temperature high pressure separator operating without pressure reduction at a temperature of 145° C. to 280° C.

8. A process according to claim 1, in which the feed originating from renewable sources is an oil or fat of vegetable or animal origin, or a mixture thereof, containing triglycerides and/or free fatty acids and/or esters.

9. A process according to claim 1, in which the part flows of the feed are identical or different in nature.

10. A process according to claim 1, in which the feed from renewable sources is co-treated with a middle distillate oil feed that is a straight run gas oil, kerosene gas oil, kerosenes derived from conversion processes, or any mixture thereof.

11. A process according to claim 1, in which at least a portion of the liquid fraction containing the paraffinic hydrocarbons subsequently undergoes a hydroisomerization carried out in the presence of a hydroisomerization catalyst, said hydroisomerization being operated at a temperature of 150° C. to 500° C., at a pressure of 1 MPa to 10 MPa, at an hourly space velocity of 0.1 h⁻¹ to 10 h⁻¹, at a hydrogen flow rate such that the volume ratio of hydrogen/hydrocarbons is 70 to 1000 Nm³/m³ of feed, said hydroisomerization catalyst comprising at least one metal from group VIII and/or at least one metal from group VIB as a hydrodehydrogenating function, and at least one molecular sieve or an amorphous mineral support as a hydroisomerizing function.

12. A process according to claim 11, in which effluent from hydroisomerization undergoes a separation in order to obtain a gaseous cut, a gasoline cut (150° C.⁻), and at least one middle distillates cut (150° C.⁺) containing kerosene and/or diesel.

13. A process according to claim 12, in which at least a portion of a 150° C.⁺ fraction derived from the separation after the hydroisomerization step is recycled to the hydroisomerization.

14. A process according to claim 1, in which the weight ratio between the recycle sent to the first catalytic zone and total flow of the feed is less than 0.5.

15. A process according to claim 1, in which the reactor comprises 3 to 6 catalytic zones.

16. A process according to claim 6, wherein the elements are nickel, molybdenum, tungsten and/or cobalt.

* * * * *